(12) United States Patent
Kitajima et al.

(10) Patent No.: US 9,612,695 B2
(45) Date of Patent: Apr. 4, 2017

(54) TOUCH PANEL

(71) Applicant: Japan Display Inc., Tokyo (JP)

(72) Inventors: Kenji Kitajima, Tokyo (JP); Ryouhei Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/270,381

(22) Filed: May 6, 2014

(65) Prior Publication Data

US 2014/0333853 A1 Nov. 13, 2014

(30) Foreign Application Priority Data

May 8, 2013 (JP) ................... 2013-098042

(51) Int. Cl.
*G06F 1/16* (2006.01)
*G06F 3/044* (2006.01)

(52) U.S. Cl.
CPC .... *G06F 3/044* (2013.01); *G06F 2203/04111* (2013.01)

(58) Field of Classification Search
USPC ...................... 345/156–174; 349/12
See application file for complete search history.

(56) References Cited

U.S. PATENT DOCUMENTS

| 2009/0262096 | A1* | 10/2009 | Teramoto | 345/174 |
| 2009/0322704 | A1* | 12/2009 | Anno | 345/174 |
| 2010/0220076 | A1* | 9/2010 | Nagata | G06F 3/044 |
| | | | | 345/174 |
| 2011/0018838 | A1* | 1/2011 | Lee | 345/174 |
| 2012/0182230 | A1* | 7/2012 | Wang et al. | 345/173 |
| 2013/0113740 | A1* | 5/2013 | Teramoto | 345/173 |
| 2013/0342505 | A1* | 12/2013 | Miyazaki | G06F 3/0416 |
| | | | | 345/174 |

FOREIGN PATENT DOCUMENTS

JP 2010-9439 1/2010

* cited by examiner

*Primary Examiner* — Jennifer Mehmood
*Assistant Examiner* — Deeprose Subedi
(74) *Attorney, Agent, or Firm* — Typha IP LLC

(57) ABSTRACT

Providing a touch panel that suppresses reflection of light and prevents a reduction in the visibility of an image even when strong outside light is incident thereon in an outdoor environment. The touch panel has a plurality of first electrodes juxtaposed in parallel to each other in a first direction and a plurality of second electrodes juxtaposed in parallel to each other in a second direction. The first electrodes are continuously formed, the second electrodes are discontinuously formed, and a connecting electrode that electrically connects each parts of each of the second electrodes at a discontinuous portion is arranged under each of the first electrodes through an interlayer insulating film. A contour line provided to the interlayer insulating film arranged on the connecting electrode is formed to be curved under each of the first electrodes or the second electrodes.

4 Claims, 4 Drawing Sheets

TOUCH PANEL

CLAIM OF PRIORITY

The present application claims priority from Japanese Patent Application JP 2013-98042 filed on May 8, 2013, the content of which is hereby incorporated by reference into this application.

BACKGROUND OF THE INVENTION

1. Field of the Invention

The present invention relates to a display device provided with a touch panel. The invention more particularly relates to a display device provided with a touch panel arranged on a front surface of a display panel, with the touch panel having a structure in which electrodes intersect with each other.

2. Description of the Related Art

Display devices, such as a liquid crystal display device or an organic electroluminescent (EL) display device, are used for electronic devices such as a mobile phone, a car navigation system, a camera, an automatic ticket machine, and an ATM terminal. In addition, a display device provided with a touch panel has widely been used in recent years, as illustrated in FIG. 1. This display device has a touch panel (TP) arranged on the front surface of a display panel (DP) through an adhesion layer (AD) provided therebetween. In operation, a user enters information corresponding to an image being displayed by touching the touch panel with a finger or a touch pen while referring to the image displayed on the display panel.

Such touch panels include a resistance film touch panel, a capacitive touch panel, and the like. In the capacitive touch panel, a transparent conductive film is formed on a glass substrate and electrodes are extended in directions intersecting with each other, so that an input position is detected in a manner which detects a change in capacitance between the electrodes when a finger or the like touches the capacitive touch panel.

A capacitive touch panel as described above is described in JP-2010-9439-A. The touch panel described in JP-2010-9439-A also has a structure in which X electrodes intersect with Y electrodes; however, this type of touch panel possess a problem as follows. When the touch panel is used outdoors or in an environment where irradiation light is strong, part of the intersecting portions of the electrodes will reflect light and shine because of the structure of the intersecting portion of the electrodes, thereby reducing the visibility of an image.

The aforementioned problem is described in detail with reference to FIGS. 2 and 3.

FIGS. 2 and 3 are plan views (on upper sides of FIGS. 2 and 3) of electrode structures used in conventional touch panels and cross-sectional views (on lower sides of FIGS. 2 and 3) taken along alternate long and short dash lines A-A' of the plan views. In each of the conventional touch panels, an X electrode EX extending in X direction and a Y electrode EY extending in Y direction are formed on a transparent substrate 1. Although FIGS. 2 and 3 each illustrate only an intersecting portion of the X and Y electrodes, patterns that are the same as the pattern illustrated are continuously formed on the upper, lower, left, and right sides of each in FIGS. 2 and 3.

A transparent electrode 3 (13) that constitutes the X electrode EX and the Y electrode EY and is made of ITO, IZO, or the like is formed on the transparent substrate 1 made of glass or the like. At a portion at which the X electrode EX intersects with the Y electrode EY, the transparent electrode 3 (13) of either one of the X electrode EX or the Y electrode EY is continuously formed, and that of the other one of the electrode EX or EY is discontinuously formed. FIGS. 2 and 3 each illustrate an example in which the transparent electrode 3 (13) constituting the X electrode EX is discontinuously formed.

In order to electrically connect the parts of the transparent electrode 3 (13) at a discontinuous portion, a connecting electrode 2 (10) formed of a transparent conductive film made of ITO or the like is arranged. At the portion at which the X electrode EX intersects with the Y electrode EY, an interlayer insulating film 4 (14) is arranged between the connecting electrode 2 (10) and the transparent electrode 3 (13) constituting the Y electrode EY. In FIG. 2, an upper bridge structure is illustrated, in which the connecting electrode 2 is arranged on the interlayer insulating film 4, and the parts of the transparent electrode 3 at the discontinuous portion, which constitute the X electrode EX, are electrically connected to the connecting electrode 2 in a region denoted by reference numeral 7. In FIG. 3, a lower bridge structure is illustrated, in which the connecting electrode 10 is arranged under the interlayer insulating film 14, and the parts of the transparent electrode 13 at the discontinuous portion, which constitute the X electrode EX, are electrically connected to the connecting electrode 10 in a region denoted by reference numeral 7.

Reference numeral 6 denotes an index matching layer to be used to visually recognize the transparent electrode 3 (13) made of ITO or the like and the connecting electrode 10. Reference numeral 9 denotes a protective film for protecting the X electrode and the Y electrode. Reference numeral 5 denotes a transparent conductive film made of ITO or the like and arranged on a back surface of the transparent substrate 1.

If the upper bridge structure illustrated in FIG. 2 is used, since the parts of the transparent electrode 3 constituting the X electrode EX are connected to the connecting electrode 2 in the connection region 7, the interlayer insulating film 4 has a contact hole in the connection region 7. The contact hole is formed in a substantially trapezoidal shape as shown in the plan view of FIG. 2. As illustrated in the cross-sectional view of FIG. 2, the connecting electrode 2 is arranged along a side surface forming the contact hole of the interlayer insulating film 4 and therefore inclined along the side surface of the interlayer insulating film 4. As a result, a portion 8 surrounded by a solid line in the plan view of FIG. 2 is made shine by the reflecting outside light and causes a reduction in the visibility of an image.

If the lower bridge structure illustrated in FIG. 3 is used, the transparent electrode 13 is formed so as to cover the interlayer insulating film 14. The interlayer insulating film 14 is traditionally formed in a substantially rectangular shape as illustrated in the plan view of FIG. 3. Similarly to FIG. 2, the transparent electrode 13 is arranged along a side surface of the interlayer insulating film 14 and inclined along the side surface of the interlayer insulating film 14 as illustrated in FIG. 3. As a result, a portion 8 surrounded by a solid line illustrated in the plan view of FIG. 3 is made shine by reflecting outside light and causes a reduction in the visibility of an image.

SUMMARY OF THE INVENTION

An object of the present invention is to provide a display device with a touch panel that solves the aforementioned problem. The display device with the touch panel that suppresses reflection of light and prevents a reduction in the visibility of an image even when strong outside light is incident on a portion, of the touch panel, at which electrodes intersect with each other in an outdoor environment.

In order to solve the aforementioned problem, the display device provided with the touch panel according to the present invention has the following technical features.

(1) In the display device provided with a display panel and a capacitive touch panel arranged on a front surface of the display panel, the touch panel has, on a transparent substrate, a plurality of first electrodes juxtaposed in parallel to each other in a first direction and a plurality of second electrodes juxtaposed in parallel to each other in a second direction intersecting with the first direction. At portions at which the first electrodes intersect with the second electrodes, the first electrodes are continuously formed, the second electrodes are discontinuously formed, and a connecting electrode that electrically connects each parts of each of the second electrodes at a discontinuous portion is formed under each of the first electrodes through an interlayer insulating film. Further, a contour line provided to the interlayer insulating film arranged on the connecting electrode is formed to be curved under each of the first electrodes or the second electrodes when a front surface of the transparent substrate is viewed in a plan view.

(2) In the display device provided with the touch panel described in item (1), the contour line provided to the interlayer insulating film forms an elliptical shape.

(3) In the display device provided with the touch panel described in item (1) or (2), the second direction is set to a horizontal direction with respect to the sight line of a person who views the display device.

In the display device provided with the touch panel according to the present invention, the touch panel has, on the transparent substrate, the plurality of first electrodes juxtaposed in parallel to each other in the first direction and the plurality of second electrodes juxtaposed in parallel to each other in the second direction intersecting with the first direction. At the portions at which the first electrodes intersect with the second electrodes, the first electrodes are continuously formed, the second electrodes are discontinuously formed, and the connecting electrode that electrically connects each parts of each of the second electrodes at a discontinuous portion is formed under each of the first electrodes through the interlayer insulating film. The contour line provided to the interlayer insulating film arranged on the connecting electrode is formed to be curved under each of the first electrodes or the second electrodes when the front surface of the transparent substrate is viewed in the plan view. Thus, regions included in the first and second electrodes, which are arranged along side surfaces of the interlayer insulating film, are small and have a curved shape. Thus, a linear portion of the region extending straight in a specific direction such as the first direction or the second direction can be small. Thus, even when the touch panel having a structure in which the electrodes intersect with each other is used in an outdoor environment in which outside light is strong, the touch panel can suppress reflection of outside light at the portion at which the electrodes intersect with each other and can prevent a reduction in the visibility of an image.

DESCRIPTION OF THE PREFERRED EMBODIMENTS

Hereinafter, an embodiment of the present invention is described.

Figure 4:
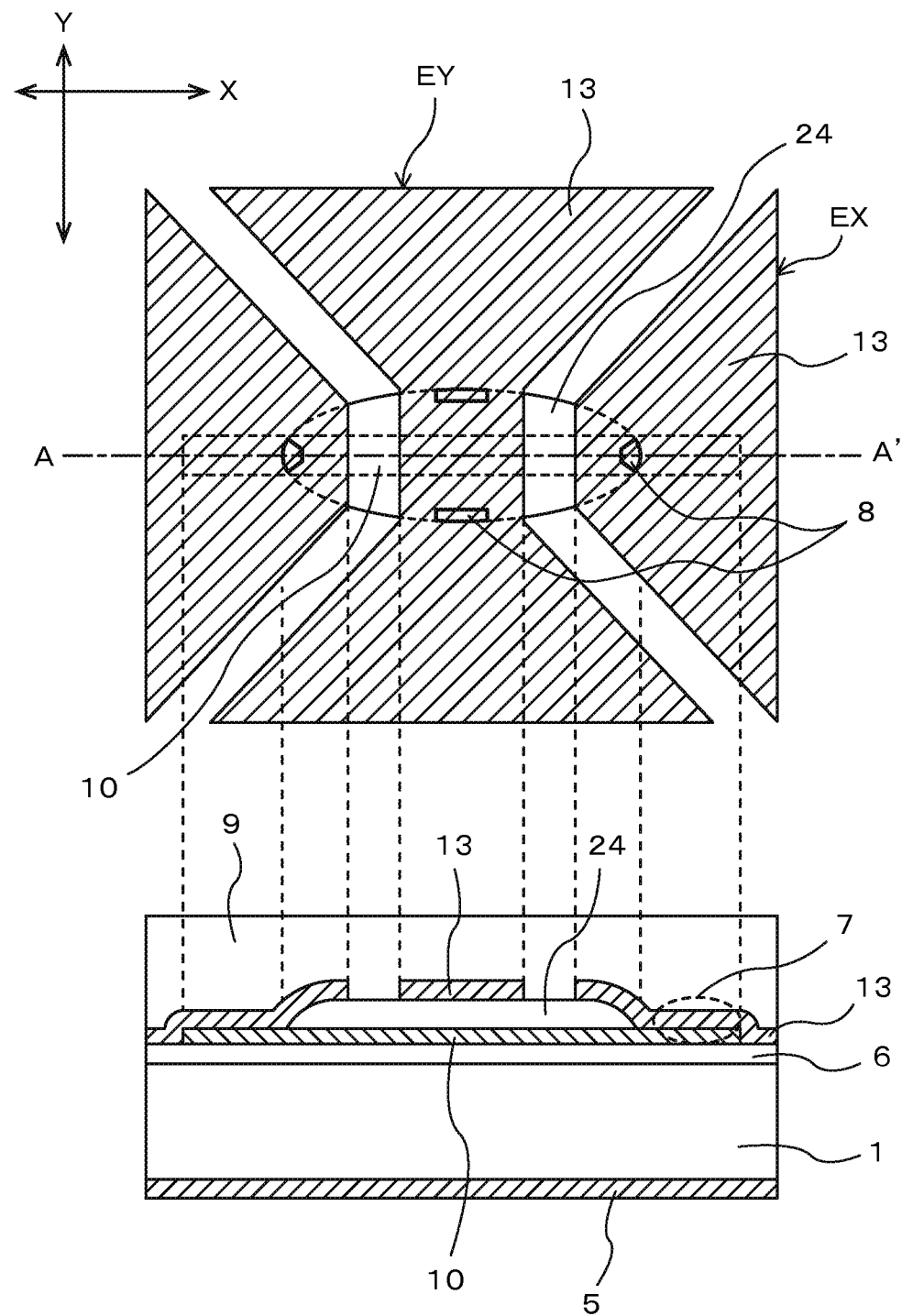
FIG. 4 is a plan view and a cross-sectional view of an electrode structure of a touch panel included in a display device provided with the touch panel according to the present invention.

In a display device having a display panel and a capacitive touch panel arranged on the front surface of the display panel, the touch panel has, on a transparent substrate 1, a plurality of first electrodes EY juxtaposed in parallel to each other in a first direction and a plurality of second electrodes EX juxtaposed in parallel to each other in a second direction intersecting with the first direction as illustrated in FIG. 4. At portions at which the first electrodes EY intersect with the second electrodes EX, the first electrodes EY are continuously formed and the second electrodes are discontinuously formed. Further, a connecting electrode 10 that electrically connects each parts of each of the second electrodes EX at a discontinuous portion is arranged under each of the first electrodes EY through an interlayer insulating film 24. In addition, as illustrated in a plan view of FIG. 4, when a front surface of the transparent substrate 1 is viewed in the plan view, a contour line provided to the interlayer insulating film 24 is set so as to be curved under each of the first electrodes EY or the second electrodes EX.

As the display panel included in the display device, a liquid crystal display panel, an organic EL display panel, or another display panel may be used.

FIG. 4 illustrates one of the Y electrodes EY as the first electrode extending in the first direction or Y direction and one of the X electrodes EX as the second electrode extending in the second direction or X direction. However, the X electrodes and the Y electrodes may be replaced with each other. In addition, the first and second directions may not be perpendicular to each other.

Figure 1:
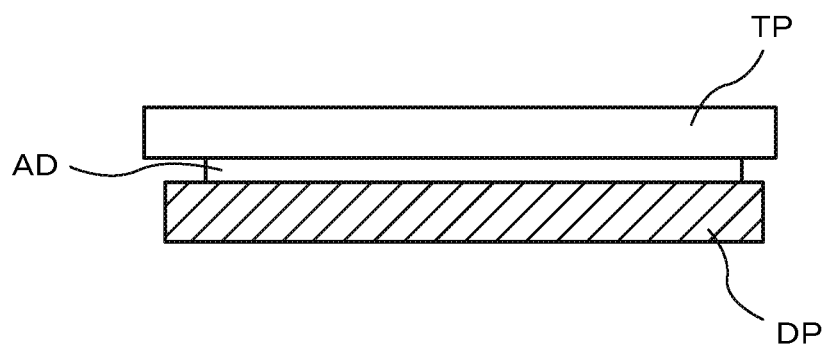
FIG. 1 is a cross-sectional view of a display device provided with a touch panel.
Figure 2:
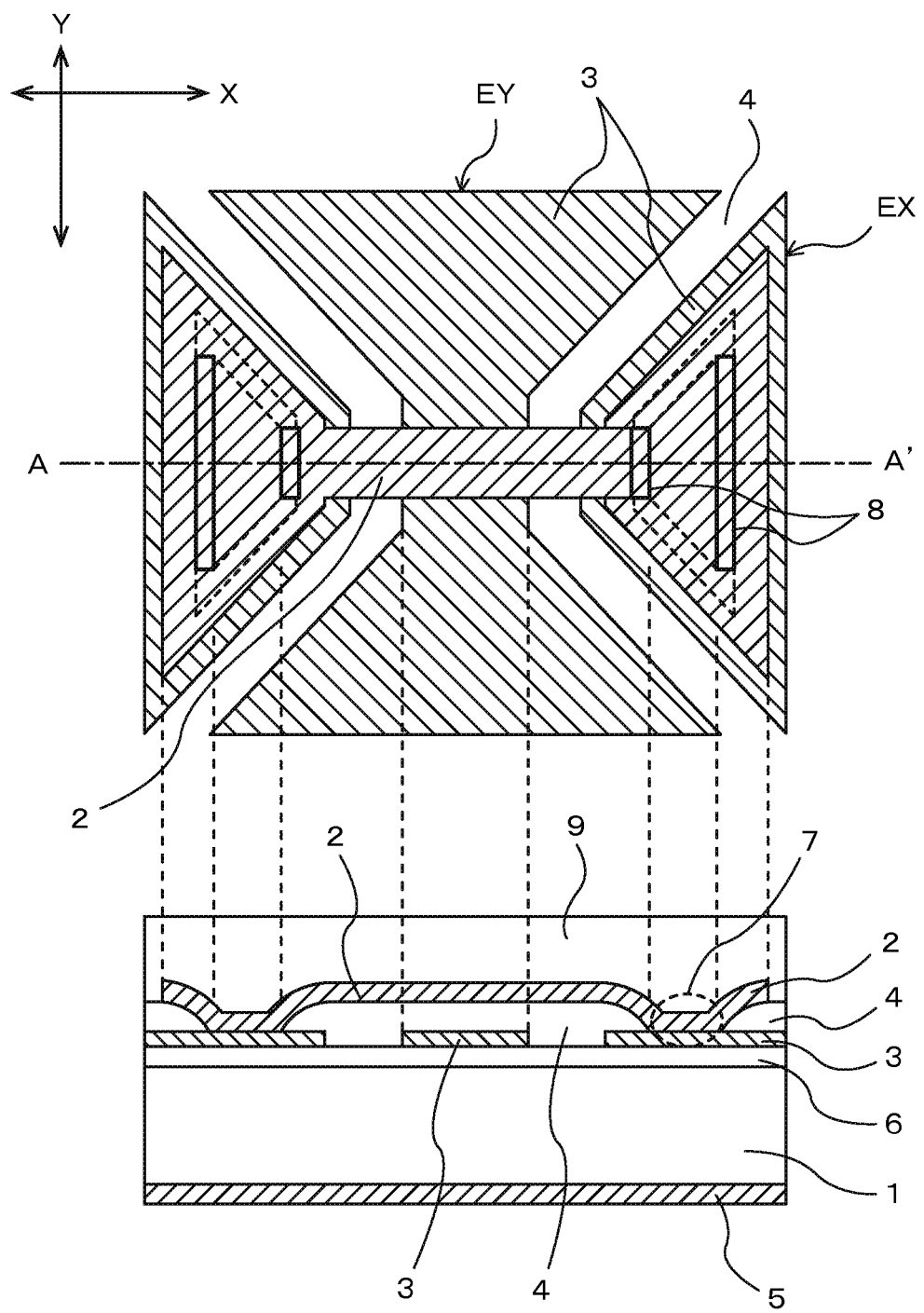
FIG. 2 is a plan view and a cross-sectional view of an electrode structure of a conventional touch panel having an upper bridge structure.
Figure 3:
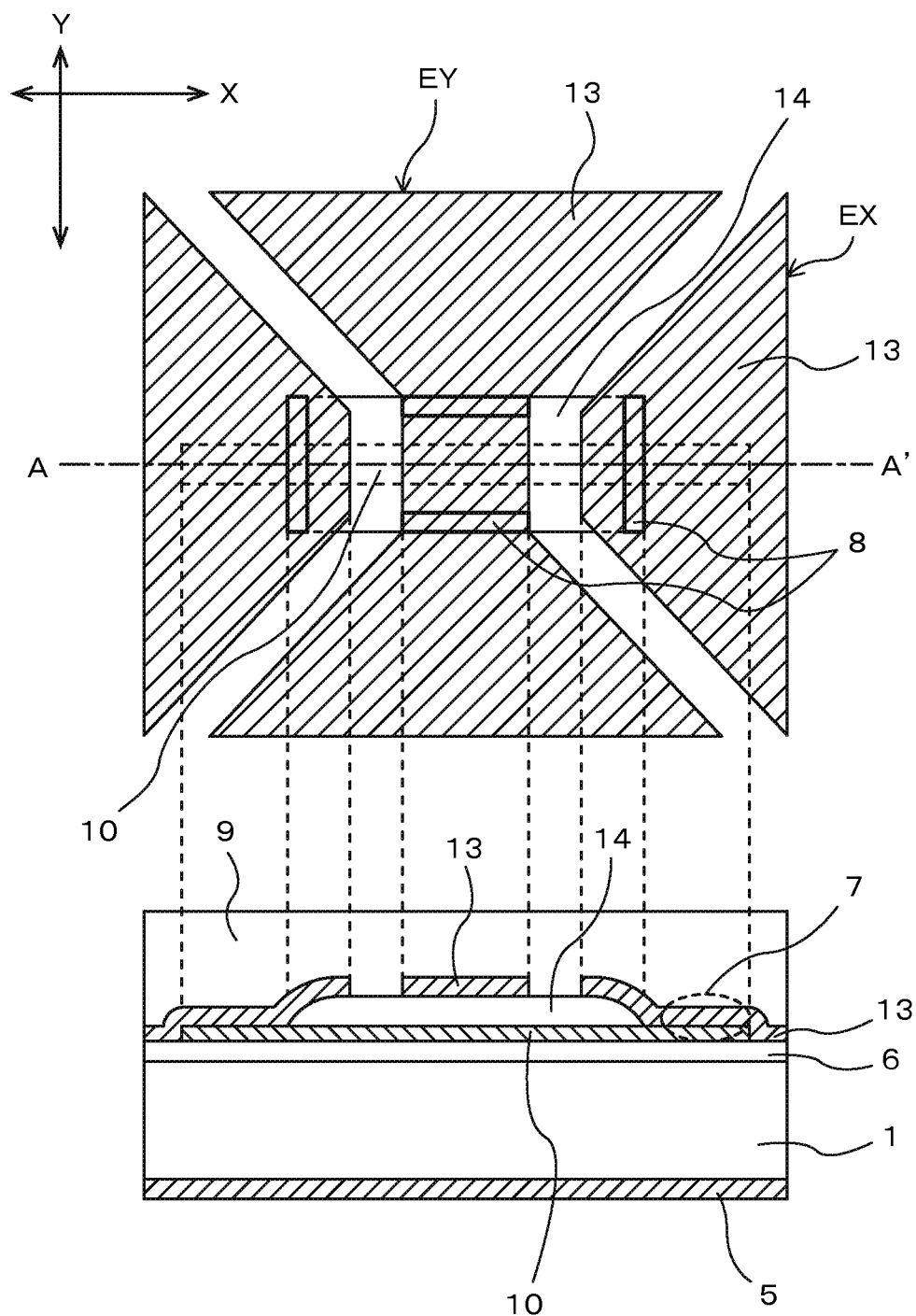
FIG. 3 is a plan view and a cross-sectional view of an electrode structure of a conventional touch panel having a lower bridge structure.

The structure of a portion at which the first electrode intersects with the second electrode according to the embodiment of the present invention is a lower bridge structure. A sequence and method of forming films such as a transparent electrode are basically the same as the conventional example illustrated in FIG. 3 and a description thereof is omitted. The connecting electrode 10 and the transparent electrode 13 are formed on an index matching IM layer 6 arranged on the transparent substrate 1. The IM layer 6, however, may be omitted.

A transparent electrode 5 made of ITO or the like is formed on a back surface of the transparent substrate 1. The transparent electrode 5 may be omitted and an overall surface electrode (common electrode) may be formed in the liquid crystal panel instead of the transparent electrode 5.

A feature of the present invention is that a contour line provided to the interlayer insulating film 24 formed under the first electrode EY to insulate the connecting electrode 10 and the first electrode is set so as to be curved under the first electrode EY or the second electrode EX as illustrated in the plan view of FIG. 4.

According to this configuration, linear portions (portions 8 surrounded by a solid line) on the transparent electrode 13, which each are arranged along each inclined side surfaces of the interlayer insulating film 24 and extend parallel to the first direction (Y axis direction) or the second direction (X axis direction), can be reduced in size. The area of the portions 8 surrounded by the solid line, which assists reflection of light, is reduced in size compared with the conventional lower bridge structure illustrated in the plan view of FIG. 3. The touch panel can suppress reflection of outside light at the intersecting portions of the electrodes and prevent a reduction in the visibility of an image.

As a material of the interlayer insulating film, ultraviolet cured resin may be used. The region of the linear portions 8 can be minimized by setting the contour line provided to the interlayer insulating film to form an elliptical shape.

The region (reflection region or portions 8 surrounded by the solid line) that assists reflection of light is changed by changing an angle of a display screen of the display device or an angle of the sight line of a person who views the display device. For example, if the reflected light makes an uncomfortable viewing situation, inclining the screen upward, downward, leftward, or rightward enables the reflected light incident on eyes of the person to be changed. However, since a human being has eyes arranged in a horizontal direction, the effect of reducing reflected light is low even when the screen is inclined leftward or rightward. Accordingly, if the area of reflection region extending parallel to a vertical direction with respect to the sight line of the person is set to be minimized among reflection regions extending parallel to a specific direction, it is possible to efficiently suppress reflection of outside light to be incident on the eyes. The area of the reflection regions 8 (reflection region extending parallel to the vertical direction) arranged on the left and right sides on the plan view of FIG. 4 is smaller than that of the reflection regions 8 (reflection regions extending parallel to a horizontal direction) arranged on the upper and lower sides on the plan view of FIG. 4. It is, therefore, preferable that the second direction (X axis direction) be set to the horizontal direction with respect to the sight line of the person who views the display screen.

According to the present invention, there can be provided the display device with the touch panel that suppresses reflection of light and prevents a reduction in the visibility of an image even if strong outside light is incident on the portion, of the touch panel, at which the electrodes intersect with each other in an outdoor environment or the like.

What is claimed is:

1. A capacitive touch panel comprising:
   a plurality of first electrodes, extending in a first direction, arranged juxtaposed in parallel to each other in a second direction intersecting with the first direction on a transparent substrate; and
   a plurality of second electrodes, extending in the second direction, arranged juxtaposed in parallel to each other in the first direction,
   wherein at intersect portions at which the first electrodes intersect with the second electrodes, the first electrodes are continuously formed and the second electrodes are discontinuously formed,
   wherein a connecting electrode that electrically connects each part of each of the second electrodes at a discontinuous portion is formed under each of the first electrodes through an interlayer insulating film,
   wherein the interlayer insulating film is formed island like on the connecting electrode in a plan view, a contour line of the interlayer insulating film has a curved portion under each of the first electrodes or the second electrodes in a plan view,
   wherein the contour line has a first linear portion which extends parallel along the first direction and reflects an outside light,
   wherein the interlayer insulating film has a top surface, a bottom surface and a side surface connecting the top surface and bottom surface,
   wherein the side surface surrounds one of the intersect portion,
   wherein the contour line is defined by a boundary between the bottom surface and the side surface of the interlayer insulating film,
   wherein the second electrode overlaps with the side surface and the top surface of the interlayer insulating film,
   wherein a length of the first linear portion is shorter than a width of the interlayer insulating film parallel to the first direction and a width of the connecting electrode parallel to the first direction in a plan view,
   wherein the curved portion of the contour line gradually and continuously changes its direction in a plan view and an angle made by the curved portion and the first linear portion of the contour line is larger than 90 degrees,
   wherein a dimension of the interlayer insulating film in the second direction is larger than a dimension of the interlayer insulating film in the first direction, and
   wherein the second direction is set to a horizontal direction, which coincides to an arrangement of eyes of a human being.

2. The touch panel according to claim 1,
   wherein the contour line provided to the interlayer insulating film is an elliptical shape.

3. The touch panel according to claim 1,
   wherein the second direction is set to a horizontal direction with respect to the sight line of a person who views a display device provided with the touch panel.

4. The touch panel according to claim 2,
   wherein the second direction is set to a horizontal direction with respect to the sight line of a person who views a display device provided with the touch panel.

\* \* \* \* \*